INVENTOR.
WILLIAM J. TRABILCY

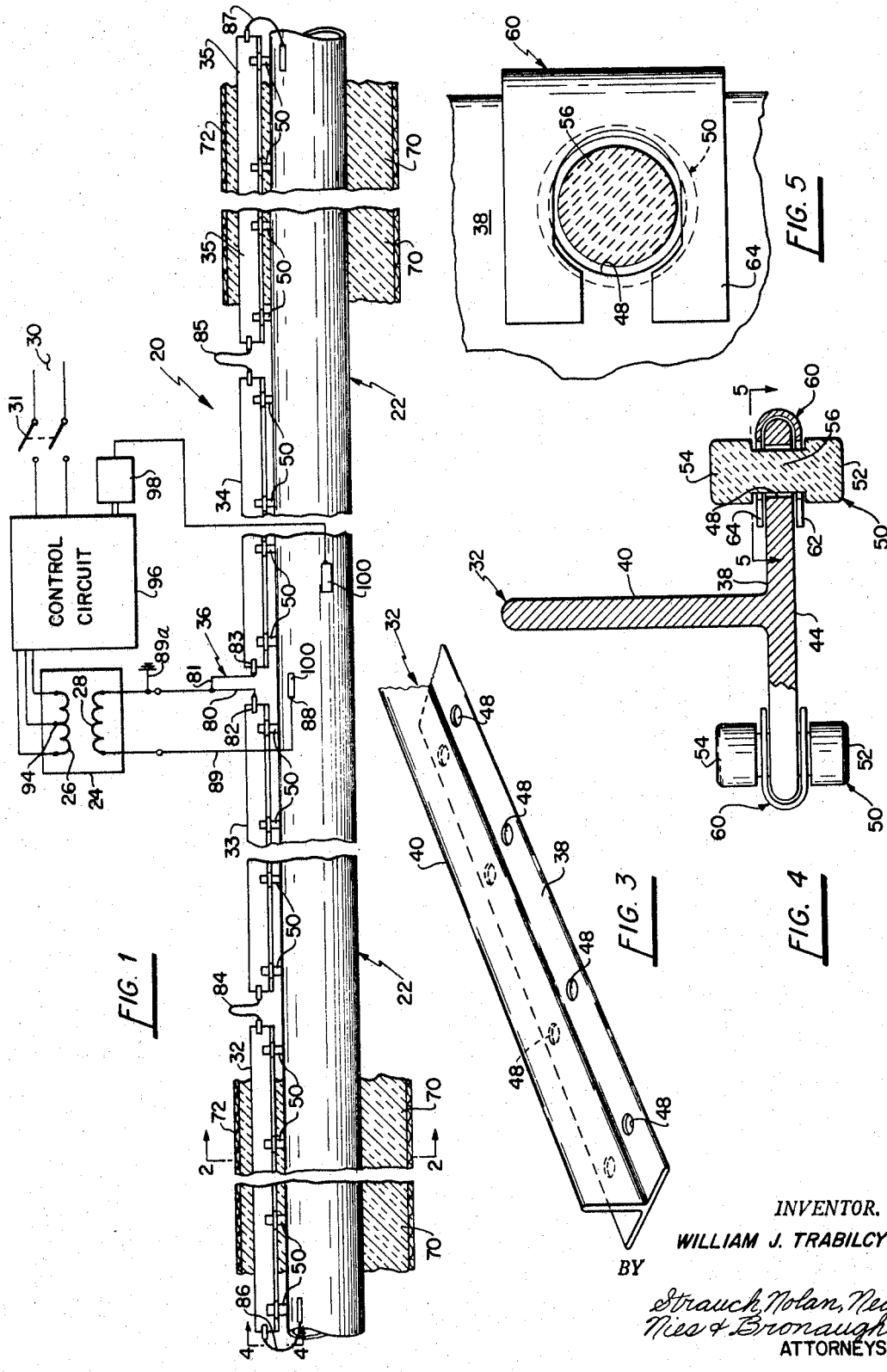

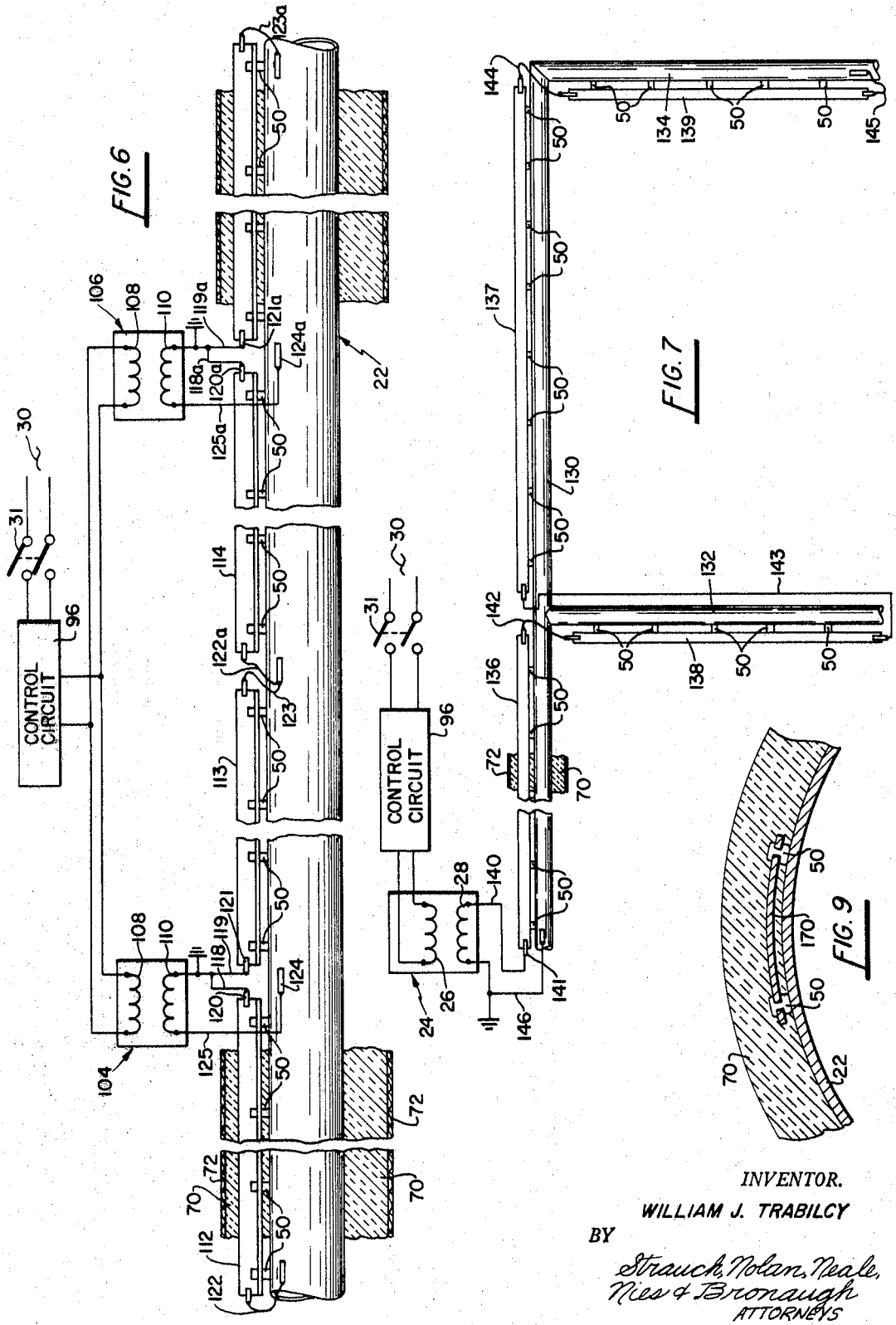

United States Patent Office 3,423,570
Patented Jan. 21, 1969

3,423,570
ELECTRICAL RADIANT HEATING SYSTEM FOR FLUID-RECEIVING CONDUIT STRUCTURES
William J. Trabilcy, 280 Prospect Ave., Hackensack, N.J. 07601
Filed Mar. 21, 1966, Ser. No. 535,784
U.S. Cl. 219—301                        9 Claims
Int. Cl. H05b 3/28; F24h 1/18, 9/12

ABSTRACT OF THE DISCLOSURE

An apparatus for heating a fluid-receiving structure and including an elongated radiant heating element closely facing the exterior of the fluid-receiving structure and being spaced therefrom by a series of rigid electrical insulators. The insulators are fixed to the radiant heating element and seat against the periphery of the fluid-receiving structure to electrically insulate the heating element from the fluid-receiving structure. In a preferred embodiment, the radiant heating element is a rigid, structural T bar which is connected to a power supply source to radiate heat.

---

The present invention relates to radiant heating systems, for pipelines, vessels, hoppers, oven dryers, and the like. This invention is especially useful for externally heating pipelines.

Prior to this invention, it has been the practice to externally heat pipelines by various means such as steam line tracers, electrical wrap-around cables, and embedded or sheath-contained rod-like electrical heating elements which effect a transfer of heat to the pipeline by conduction. These pipeline heating systems each have shortcomings which make their use objectionable especially where the pipeline is long, is unaccessible, as in underground installations, or both.

Steam line tracing systems, for example, require an available source of steam and, for long runs, require elaborate systems of traps which must constantly be maintained. Electrical wrap around cables are objectionable since, after a relative short time, they become brittle and break to interrupt the circuit. Moreover, dielectric failures due, for instance, to elevated heating temperatures presents a pronounced hazard and require continuous maintenance.

Embedded electrical heating elements are also subject to the same deficiencies as wrap around cables. As described in United States Letters Patent No. 2,707,313 issued on May 3, 1955 to M. D. McShurley et al., the electrical rods are embedded in an insulating material comprising a rigid mass of solid magnesium oxide. The insulating material is shaped to seat against the external periphery of the pipeline, and the electrical heating rods, sealed in the insulation, extend longitudinally of the pipeline axis to effect heat transfer by conduction. This insulation or other forms of insulating sheaths are readily subject to dielectric failure, thus requiring continuous inspection and maintenance.

It will be appreciated that pipelines or vessels to be heated are often so located, as in underground installations, as to make inspection and maintenance impractical if not impossible. Accordingly, these previously proposed pipeline heating systems are not suitable for such installations. Furthermore, heat transfer by conduction generally is inefficient owing to temperature gradient losses. Embedded or sheath contained electrical heating systems are also disadvantageous for use in heating long lengths of pipelines on the order of 20 miles and more owing to the high resistance of the electrical heating elements which require a considerable amount of power input with a consequent, objectionable power factor loss.

Aside from externally heating pipelines in the foregoing manner, it has been proposed to heat the pipeline by passing an electrical current therethrough. This type of heating system, however, is not suitable for large diametered pipe or vessels or for the long pipeline runs owing to the large mass of pipe through which an energizing current must pass.

A major object of this invention is to provide a novel radiant heating system which is not subject to the foregoing disadvantages and which is constructed for efficient use in a variety of different applications.

A more specific object of this invention is to provide a novel radiant heating system for a pipeline, vessel, or oven wherein heating elements having large hysteresis losses are electrically heated by alternating current and effect the transfer of heat by radiation over a large surface.

Another object of this invention is to provide an electrically energized, radiant heating system with a novel support structure for insulating the radiant heating elements from the object being heated.

Still another object of this invention is to provide a novel electrically energized, radiant heating system having low resistance heating elements so constructed and arranged for heating a pipeline and the like that the power input per unit length is exceptionally low.

Still another object of this invention is to provide a novel load circuit for an electrical heating system.

Further objects of this invention will appear as the description proceeds in connection with the appended claims and the annexed drawings wherein:

FIGURE 1 is a partially schematic view in elevation illustrating the apparatus constructed according to one embodiment of this invention;

FIGURE 3 is a perspective view of one of the radiant heating elements shown in FIGURE 1;

FIGURE 4 is an enlarged section taken substantially along lines 4—4 of FIGURE 1;

FIGURE 5 is a section taken substantially along lines 5—5 of FIGURE 4;

FIGURE 6 is a partially schematic elevation illustrating a modified embodiment of this invention;

FIGURE 7 is a schematic view illustrating still another embodiment of this invention;

FIGURE 9 is a cross section similar to FIGURE 2 and illustrating another embodiment of this invention.

Figure 8:
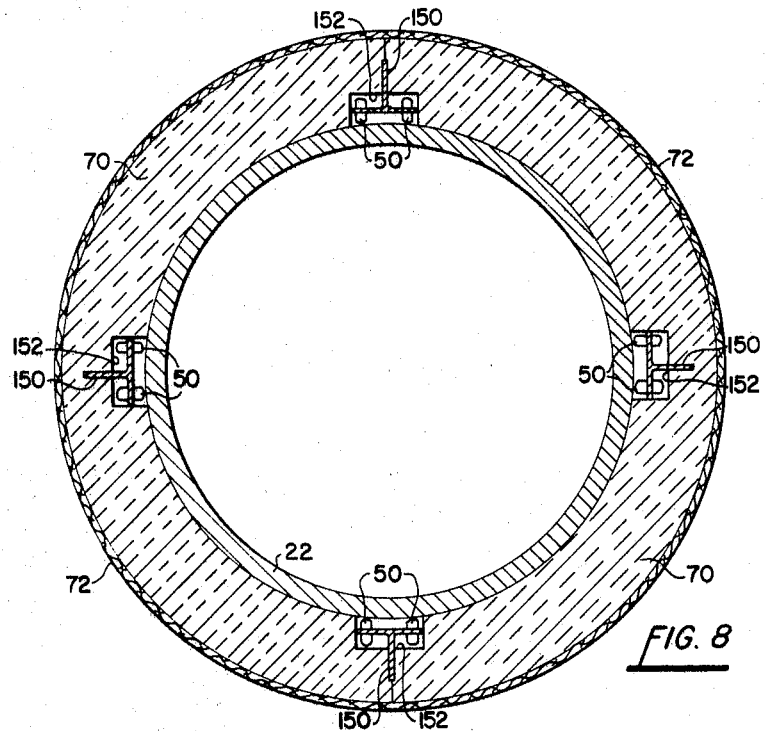
FIGURE 8 is a cross section similar to FIGURE 2 and illustrating still a further modified embodiment of this invention.

Referring now to the drawings and more particularly to FIGURE 1, the reference numeral 20 generally designates the heating apparatus of this invention as applied for heating a pipeline 22. Apparatus 20 is shown to comprise a transformer 24 of any suitable, conventional form having a primary winding 26 and a secondary winding 28. Primary winding 26 is connected across a suitable voltage source 30 by a disconnect switch 31.

With continued reference to FIGURE 1, a series of pipeline heating elements 32, 33, 34, and 35 are shown to be connected in a load circuit 36 containing secondary winding 28. Each heating element 32–35, as best shown in FIGURE 2, is a rigid structural member and, according to the preferred embodiment of this invention, comprises a T-bar having mutually perpendicular, flat-sided plate sections 38 and 40 respectively defining the head and leg of the T configuration.

Figure 2:
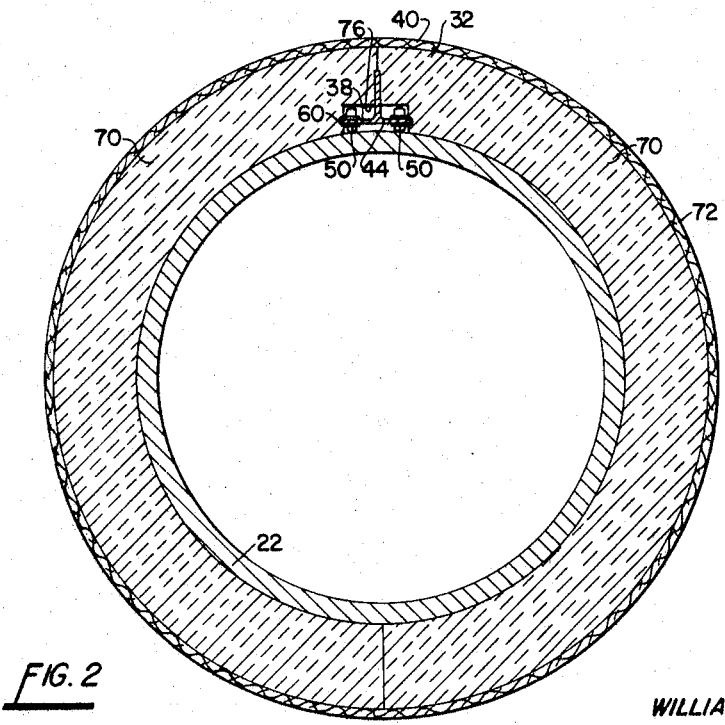
FIGURE 2 is an enlarged section taken substantially along lines 2—2 of FIGURE 1.

As shown in FIGURES 1 and 2, heating elements 32–35 are axially aligned and are disposed in end-to-end relationship longitudinally along the external periphery of pipeline 22. The plate sections 40 of elements 32–35 extending radially outwardly from pipeline 22. Plate sections 38 have radially inwardly directed radiant heating surfaces 44 which face the external periphery of pipeline 22 and which preferably are contained in a common plane extending in parallel spaced apart relation to a tangential plane touching the pipeline periphery where it is radially intersected by a plane containing plate sections 40.

As shown in FIGURES 2–4, heating element 32 is formed with two straight rows of parallel through bores 48 extending through plate section 38 preferably equidistantly on opposite sides of plate section 40. Coaxially extending through each bore 48 is a cylindrically shaped, rigid spacer 50 which may be formed of any suitable electrical insulating material and which preferably is made from a ceramic material to withstand elevated heating temperatures.

Each spacer 50 is formed with uniformly, equally diametered end sections 52 and 54 which are integrally joined together by a reduced diametered intermediate section 56. Section 56 is coaxially received in its associated bore 48, and sections 52 and 54 axially protrude at opposite ends beyond the opposite facing surfaces of plate section 38. In this embodiment, each spacer 50 is fixed to plate section 38 by a horseshoe-shaped spring clip 60.

As shown in FIGURE 5, each spring clip 60 is formed with parallel, bifurcated arms 62 and 64 extending on opposite sides of plate section 38 and resiliently gripping spacer 50 at the juncture of section 56 with sections 52 and 54 to thus retain the spacer in place on plate section 38.

As best shown in FIGURES 1 and 2, the rounded ends of spacer sections 52 are separably seated on the external periphery of pipeline 22 to space and electrically insulate heating element 32 from the pipeline. Spacers 50 are sized to space surface 44 from the periphery of pipeline 22 to provide for the heating of the pipeline by radiation. Thus, spacers 50 not only electrically insulate heating elements 32 from pipeline 22, but also space the radiant heating surface 44 from the pipeline periphery by an optimum distance to effect the most efficient heating of the pipeline by heat radiated from surface 44. Spacers 50 are longitudinally spaced apart in each row by sufficiently small distances to assure that heating element 32 is uniformly spaced from the periphery of pipeline 22 throughout its entire length.

As shown in FIGURE 1, heating elements 33–35 are preferably of the same construction as heating element 32, each carrying two rows of spacers 50 in the same manner described with respect to heating element 32. Although four heating elements are shown in this embodiment, it will be appreciated that any number may be used to favorably meet existing conditions and to produce a desired temperature increase in the fluid flowing through the pipeline. While heating elements 32–36 are desirably supported in end-to-end relation for a purpose to be explained later on, it is apparent that they may be circumferentially offset with respect to each other.

As shown in FIGURES 1 and 2, pipeline 22 is covered with a layer of thermal and electrical insulating material 70 over which a cover 72 of suitable fabric is sewn or otherwise secured. The ends of the layer of insulating material 70, as seen in FIGURE 2, are butted together in a plane containing plate sections 40 of heating elements 32–36. The inner periphery of insulating material 70 is notched adjacent to the abutting ends of the layer to define a longitudinal, inwardly opening channel 76 which receives plate sections 38 of heating elements 32–35. Plate sections 40 are clamped between the opposed abutting ends of the layer of insulating material 70 by tightly securing cover 72 in place around the insulating material. Thus clamped, heating elements 32–35 are secured against outward or circumferential displacement by engagement with the insulating material 70. Inward displacement of heating elements 32–35 is prevented by abutting engagement of spacers 50 with the external periphery of pipeline 22. Thus, a unique, simplified means of securing heating elements 32–35 in place is provided for.

As shown in FIGURE 1, load circuit 36 comprises a pair of electrical conductors 80 and 81 which respectively connect clip lugs 82 and 83 to one terminal of secondary winding 28. Lugs 82 and 83 are respectively fixed as by welding to adjacent ends of heating elements 33 and 34. The opposite ends of heating elements 33 and 34 are electrically connected to adjacent ends of heating elements 32 and 35 by lug and jumper assemblies 84 and 85 respectively. The opposite ends of heating elements 32 and 35 are electrically connected to pipeline 22 by jumper and lug assemblies 86 and 87 respectively.

Still referring to FIGURE 1, a further clip lug 88 is fixed as by welding to pipeline 22 longitudinally between the points at which jumper assemblies 86 and 87 are connected to the pipeline. Lug 88 is connected by an electrical conductor 89 to the other terminal of secondary winding 28 to complete the load circuit. The transformed secondary terminal connected to conductor 80 may be connected to ground as indicated at 89a. With this arrangement two parallel circuits are provided for. The first of these circuits may be traced from one terminal of winding 28, through conductor 80, through heating element 33, through jumper assembly 84, through heating element 32, through jumper assembly 86, through the left-hand portion of pipeline 22 and through conductor 89 to the other terminal of winding 28. Similarly, the other parallel circuit may be traced from one terminal of winding 28 and serially through conductor 81, heating element 34, jumper assembly 85, heating element 34, jumper assembly 87, the right-hand portion of pipeline 22, and conductor 89 to the other terminal of winding 28.

In the embodiment shown in FIGURE 1, the pipeline portion between the clip lug connections of assembly 86 and conductor 89 and pipeline portion between the clip lug connections of assembly 87 and conductor 89 have equal impedances. The impedance of heating elements 32 and 33 are also made to equal the impedance of heating elements 34 and 35. Consequently, it is apparent that two parallel electrical circuits having equal electrical impedances are provided through pipeline 22.

The current passed through heating elements 32–36 by energizing transformer 23 will heat elements 32–36. Surfaces 44 thereby become hot to radiate heat to pipeline 22. Owing to the equal impedances in both parallel circuits, it is apparent that heating elements 32–35 are uniformly heated to thereby uniformly heat pipeline 22.

Heating elements 32–35 are made from any suitable ferromagnetic material or other relatively non-magnetic materials such as chrome, nickel, or alloys thereof. Suitable ferromagnetic materials include structural steel and alloys thereof. Conventional structural steel members (such as open hearth steel) produced by steel mills are readily acceptable for incorporation into this invention and provide sufficient rigidity to enable long length to be used without encountering any objectionable warpage. According to this invention, it is preferred that the heating elements be formed from a material or materials in which hysteresis and eddy currents mainly produce the heat when the heating elements are energized with an alternating current. Such mtaerials that are suitable for this invention advantageously have low electrical resistances. Thus impedance heating is effected in which D.C. resistance plays a negligible part. In comparison, the heat produced by conventional electrical heating coils depends primarily upon resistance and have negligible hysteresis effects. Structural members having a large hysteresis loop and a large radiating surface are therefore preferred for use in this invention. The work done in cyclically reversing the current thus will produce appreciable heating. Such structural members have been referred to as magnetic conductors.

By using structural members having low electrical resistance and large radiating surfaces as radiant heating elements, a correspondingly low wattage output per lineal foot of heating element thus can be distributed over long distances while employing but one load circuit. In one example of this invention, the temperature of two inch pipe, depending on the insulation, may be increased to about 150-200° F. with an input of approximately 10 watts per foot, or one watt per square inch of radiating surface from heating elements 32–35. With such construction, any temperature that the heating elements can withstand is easily obtained.

Advantageously, one or more additional taps may be provided for on primary winding 26 as indicated at 94 in FIGURE 1. Tap 94 is so spaced from the primary winding end terminals as to provide a preselected number of primary turns between the tap and terminal connections. The voltage induced into secondary winding 28 is in inverse proportion to the number of turns across the primary voltage source.

A control circuit 96 of any suitable form may advantageously be used to control the tap and terminal connections of winding 26 across source 30. Control circuit 96 may be made to be responsive to operation of a suitable, conventional thermostat 98 having a thermostatic element 100 strapped to pipeline 22. Circuit 96 thus may respond to the temperature of the pipeline to control the number of primary turns across source 30 as to maintain a substantially constant pipeline temperature. Any other suitable form of temperature responsive circuitry may alternatively be used to control energization of primary winding 26 for maintaining a substantially constant pipeline temperature.

From the foregoing description it will be appreciated that the radiant heating apparatus of this invention is inexpensive, easy to install, highly efficient, and safe, in addition to having a long, maintenance-free life. This heating apparatus may be used to heat all types of pipe, tanks, and vessels and generally uses low voltage with a unique load circuit that eliminates personnel hazards. Moreover, the apparatus of this invention can be easily installed on existing, as well as new pipelines at less cost than conventional systems and is especially advantageous where the pipeline is inaccessible as in underground installations. It also is to be noted that factory fabricated pipe conduits can be furnished incorporating the radiant heating elements of this invention and the pipeline insulation.

In place of spring clips 60, spacers 50 may be secured in place by applying sufficient, opposing pressures simultaneously to opposite side edges of each plate section 38 to inwardly crimp the cylindrical walls of bores 48 and thereby establish a press fit with sections 56 received in bores 48.

In FIGURE 6 a multiple parallel circuit is illustrated to comprise a plurality of transformers 104 and 106 each having a primary winding 108 and a secondary winding 110. In this embodiment, a pair of heating elements 112 and 113 are connected in the load circuit of transformer 104 and a pair of heating elements 114 and 115 are connected in the secondary load circuit of transformer 106. Heating elements 112–115 are of the same construction as heating elements 32–36 and as shown in FIGURE 6 are arranged in end-to-end relationship. Heating elements 112–114 carry spacers 50 which insulate elements 112–115 from the pipeline and which space the radiating surfaces of the heating elements from the periphery of pipeline 22 in the same manner as described in the embodiment of FIGURES 1–5.

With continuing reference to FIGURE 6, the primary windings 108 of transformers 104 and 106 are connected in parallel across voltage source 30. One secondary winding terminal transformer 104 is connected by suitable electric conductors 118 and 119 to clip lugs 120 and 121 respectively. Lugs 120 and 121 are respectively fixed as by welding to adjacent ends of heating elements 112 and 113. The opposite ends of heating elements 112 and 113 are respectively connected by clip lug and jumper assemblies 122 and 123 to pipeline 22. A clip lug 124 is fixed as by welding to pipeline 22 intermediate the connections of jumper and lug assemblies 122 and 123. Lug 124 is connected by an electrical conductor 125 to the other secondary winding terminal of transformer 104.

The secondary load circuit connections of the transformer 106 to heating elements 114 and 115 are the same as that just described for transformer 104. Accordingly, like reference numerals have been used to identify like elements except that the circuit elements associated with transformer 106 have been suffixed by the letter "a." The portions of pipeline 22 extending between adjacently disposed lug connections at 122, 124, 123, 124a, and 123a preferably are of equal impedance as described in the embodiment of FIGURES 1–5. The terminals of secondary windings connected to conductors 118 and 118a are grounded to earth as shown.

Thus, it is apparent that transformers 104 and 106 each are provided with two parallel load circuits. One of these parallel circuits for transformer 104 may be traced from one secondary winding terminal serially through conductor 118, heating element 112, jumper and clip lug assembly 122, the portion of pipeline 22 extending between the connection of assembly 122 and clip lug 124 and conductor 125 to the other secondary winding terminal. The other parallel circuit for transformer 104 may be traced from one secondary winding terminal serially through conductor 119, heating element 113, jumper assembly 123, the portion of pipeline 22 extending between the connection of jumper assembly 123 and lug 124 and conductor 125 to the other secondary winding terminal. The two parallel circuits for transformer 106 may be traced in the same manner as described for the secondary circuits associated with transformer 104.

In the embodiment illustrated in FIGURE 7, a series load circuit is shown for heating a pipeline assembly having a main pipeline section 130 which is connected to two branch lines 132 and 134. In this embodiment, a pair of heating elements 136 and 137 are disposed in end-to-end relation longitudinally along section 130. A further pair of heating elements 138 and 139 respectively are disposed longitudinally along branch lines 132 and 134. Heating elements 136–139 are of the same construction as heating elements 32–36 and carry spacers 50 and are arranged in the same manner as described in connection with the embodiment of FIGURES 1–5.

With continuing reference to FIGURE 7, one terminal of secondary winding 28 is shown to be connected by an electrical conductor 140 to a clip lug 141. Clip lug 141 is fixed as by welding to one end of heating element 136. The opposite end of heating element 136 is electrically connected by a jumper and clip lug assembly 142 to one end of heating element 138. The opposite end of heating element 138 is connected by a jumper and clip lug assembly 143 to one end of heating element 137. The other end of heating element 137 is connected by a jumper and clip lug assembly 144 to one end of heating element 139. The opposite end of heating element 139 is connected by a jumper and clip lug assembly 146 to branch line 134. The other terminal of secondary winding 28 is connected to the main pipe section 130 by a conductor and clip lug assembly 146. The transformer secondary terminal connected to conductor 148 is grounded to earth as shown.

The foregoing load circuit in FIGURE 7 may be traced from one secondary winding terminal serially through conductor 140, heating element 136, jumper assembly 142, through heating element 138, jumper assembly 143, heating element 137, jumper assembly 144, heating element 139, and back through branch line 134, pipe section 130 and assembly 146 to the other secondary winding terminal.

In the embodiment illustrated in FIGURE 8, a plurality of parallel, coextensive radiant heating elements 150 are circumferentially spaced apart by equal distances and extend longitudinally along pipe line 22. Heating elements 150 are the same construction as heating elements 32–35. As shown, heating elements 150 carry spacers 50 and are each positioned relative to pipeline 22 in the same manner as described in the embodiment of FIGURES 1–5. The layer of insulating material 70 extending around pipeline 22 is formed with longitudinal inwardly opening channels 152 receiving heating elements 150. This arrangement of heating elements is especially suitable for heating exceptionally large diameter pipes, tanks, hoppers or the like.

Instead of T-bars, each of the heating elements 32–35 may be formed as a plate or bar 170 as shown in FIGURE 9. Plate 170 may be curved as shown or it may be straight with flat sides. Spacers 50 are received in holes formed through plate 170 and crimped in place by applying pressure to the opposite side edges of the plate in the manner previously described. To the extent that this embodiment is the same as the previous embodiments, like reference numerals have been used to identify like parts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A radiant heating apparatus for heating a fluid-receiving structure comprising an elongated heating element having a radiant heating surface closely facing and exposed to the exterior of said structure, electrical insulator means carried by said element for spacing and electrically insulating said element from said structure, an electrical power supply source, and circuit means connecting said supply source to said heating element for passing current through said element to radiate heat from said surface, said heating element comprising a structural member having a plate section defining said radiant surface, and said insulating means comprising a plurality of spaced apart rigid members fixed to said plate section, said heating element extending longitudinally of said structure, and said rigid members extending through apertures in said plate section and being seated against the periphery of said structure.

2. The radiant heating apparatus defined in claim 1 comprising means fixing said heating element to said structure including a layer of heat insulating material extending around the periphery of said structure and means confining said insulating material on said structure.

3. The radiant heating apparatus defined in claim 2 wherein said rigid members are substantially cylindrical and are each formed with an enlarged end section integrally joined to a section of reduced diameter, said reduced diametered section being received in an associated aperture in said plate section and said enlarged section being seated against the periphery of said structure.

4. The radiant heating apparatus defined in claim 3 wherein said reduced diametered section is disposed with a press fit in its associated aperture.

5. The radiant heating apparatus defined in claim 3 comprising spring clip means engaging each rigid member and said plate section to fix each rigid member against longitudinal displacement on said heating element.

6. The radiant heating apparatus defined in claim 3 wherein said structural member is formed with a further plate section extending substantially at right angles from the first mentioned plate section and being snugly clamped between opposed ends of said layer of heat insulating material.

7. The radiant heating apparatus defined in claim 6 wherein said structural member is a T-bar, the head of said T-bar defining said first mentioned plate section and the leg thereof defining said further section, said rigid members being disposed in two rows on opposite sides of said leg.

8. An apparatus for heating fluid flowing through a pipeline with radiant energy comprising a heating element in the form of an elongated structural member extending longitudinally along the outer periphery of said pipeline and having a longitudinally extending plate section defining a heat radiating surface facing and exposed to the external periphery of said pipeline, means fixing said structural member to said pipeline, a plurality of electrical insulating members carried by said plate section for (a) spacing said radiating surface at a predetermined distance from the periphery of said pipeline and (b) electrically isolating said structural member from said pipeline, an electrical power supply means comprising a transformer having a secondary winding and means connecting said structural member to said secondary winding to establish a load circuit for passing current through said structural member to radiate heat from said surface, said structural member being a T-bar having a head defining said plate section, and said means fixing said structural member to said pipeline comprising a layer of material peripherally surrounding said pipeline and having opposed abutting end faces, the leg of said T-bar being radially clamped between said opposed end faces.

9. The apparatus defined in claim 8 wherein said insulating members are cylindrical and extend through apertures in said head on opposite sides of said leg, said leg extending substantially radially from said pipeline.

References Cited

UNITED STATES PATENTS

| 3,377,464 | 4/1968 | Rolfes | 219—301 |
| 1,710,943 | 4/1929 | Odell | 219—303 |
| 1,920,685 | 8/1933 | Evans | 219—311 |
| 1,971,387 | 8/1934 | Scoville | 219—535 X |
| 2,459,816 | 1/1949 | Handley | 219—311 X |
| 2,792,895 | 5/1957 | Carpenter | 219—277 X |
| 3,031,563 | 4/1962 | Koester | 219—301 |
| 3,257,498 | 6/1966 | Kahn. | |

FOREIGN PATENTS

| 94,723 | 9/1959 | Norway. |

ANTHONY BARTIS, *Primary Examiner.*

U.S. Cl. X.R.

219—535, 311; 138—33; 137—341; 222—146; 219—328